Patented Feb. 18, 1947

2,416,042

UNITED STATES PATENT OFFICE 2,416,042

N-ALKYLIDENE, N-CYCLOALKYLIDENE, AND N-ARALKYLIDENE ALIPHATIC DIAMINES

Richard E. Brooks, Edgemoor Terrace, Del., assignor to E. I. du Pont de Nemours & Company, Wilmington, Del., a corporation of Delaware No Drawing. Application December 7, 1944, Serial No. 567,131

9 Claims. (Cl. 260—566)

This invention relates to the preparation of nitrogen compounds and more particularly to improvements in the preparation of certain polyamide intermediates, namely, N-monoalkylidene diamines, N,N'-dialkylidene diamines, N-monoaralkylidene diamines and N,N'-diaralkylidene diamines, which substances are readily converted to N-monoalkyl diamines, N,N'-dialkyl diamines, N-monoaralkyl diamines, and N,N'-diaralkyl diamines.

It is already known that N,N'-dialkylidene diamines may be prepared by condensation of carbonyl compounds with aliphatic diamines (Ber., 20, 267). In general the heretofore available methods of preparing N,N'-dialkylidene diamines have been somewhat unsatisfactory in that appreciable amounts of polymeric materials have been produced as by-products. Moreover, it has been especially difficult to prepare the N-monoalkylidene diamines. If a solvent is employed to decrease the rate of formation of polymeric by-products, the reaction between the carbonyl compound and the aliphatic diamine generally does not take place completely, and the yields of N-mono-alkylidene diamine and N,N'-dialkylidene diamine are accordingly somewhat low. A brief review of methods for preparing such aldehyde-amine condensation products appears in J. A. C. S. 66, 82 (1944). In accordance with the prior art, N-alkylidene aliphatic amines have been hydrogenated to yield N-alkyl amines.

An object of this invention is to prepare aliphatic N-monoalkylidene diamines, N,N'-dialkylidene diamines, N-monoaralkylidene diamines and N,N'-diaralkylidene diamines in high yields and in the absence of appreciable quantities of polymeric by-products. Another object is to provide a process for the manufacture of products which, on hydrogenation, yield N-monoalkyl, N,N'-dialkyl, N-monoaralkyl, and N,N'-diaralkyl diamines. Other objects will appear hereinafter.

These objects are accomplished in accordance with the invention by treating an aliphatic diamine with a carbonyl compound of the class consisting of aliphatic aldehydes, aliphatic ketones, aromatic aldehydes, aromatic ketones, mixed aromatic-aliphatic ketones and cycloaliphatic ketones in the presence of a water carrier, i. e. a substance which, upon distillation from the reaction mixture, removes water therefrom generally in the form of a constant boiling azeotrope. The reaction may also be carried out in accordance with this invention in the presence of a diluent which is a solvent for the reactants and the desired product of the reaction, but in which water is not completely soluble. In the latter method, the water layer may be separated from the reacting mixture by decantation.

Any aliphatic diamine may be employed in the practice of this invention. Suitable aliphatic diamines are members of the homologous series, $H_2N(CH_2)_nNH_2$, $n$ being an integer, examples of which are ethylene diamine, trimethylenediamine, 1,3-diaminobutane, tetramethylenediamine, pentamethylenediamine, hexamethylenediamine, decamethylenediamine, and the like. Suitable carbonyl compounds of the class consisting of aldehydes and ketones are formaldehyde, acetaldehyde, propionaldehyde, n-butyraldehyde, isobutyraldehyde, acetone, ethyl methyl ketone, cyclohexanone, benzaldehyde, and the like. If desired, the initial molar ratio of carbonyl compound to diamine may be from about 10:1 to about 1:10, preferably about 1:1 to about 2:1. Suitable water-removing agents are isopropanol, isobutanol, hexane, octane, benzene, toluene, cyclohexane, methylcyclohexane and the like. The preferred water-removing agents or carriers are substances which dissolve both the aliphatic diamine and the carbonyl compound, and which also are stable towards hydrogen under the conditions employed in a subsequent hydrogenation of the N-monoalkylidene, N,N'-dialkylidene, N-monoaralkylidene and N,N'-diaralkylidene aliphatic diamines produced. Cyclohexane is a substance which is particularly well suited for these purposes.

The preparation of aliphatic N-monoalkylidene, N,N'-dialkylidene, N-monoaralkylidene and N,N'-diaralkylidene diamines is generally conducted in accordance with the invention by adding an aliphatic or aromatic aldehyde or ketone or cycloaliphatic ketone to an aliphatic diamine in a solvent, maintaining the resulting mixture at a temperature preferably within the range of about 20° to about 120° C., and removing the water thus produced by azeotropic distillation or decantation. During the early stages of the reaction it is desirable to cool the mixture, keeping the temperature below about 55° C. The reaction takes place fairly rapidly and, if the solvent is water-insoluble, water separates as a layer soon after the reactants are mixed. This layer may be removed either by distillation or decantation, but is preferable to remove the water by azeotropic distillation, since the water layer frequently contains dissolved reactants. In one embodiment, after the water thus formed has been removed, distillation of the solvent is begun, and during this time, reaction continues to take place as shown by the formation of additional amounts of water. In order to force the reaction to completion the reaction mixture is heated and distillation is continued until formation of water virtually ceases. If, in one mode of practicing the invention, it is desired to isolate the N-alkylidene aliphatic diamines, the solvent may be removed by distillation, and the resulting residue may be distilled, preferably at diminished pressures. In this way N-alkylidene aliphatic diamines are produced in yields of as high as about 86%.

If it is desired to prepare N-alkyl or N-aralkyl aliphatic diamines without isolation of the N-alkylidene and N-aralkylidene aliphatic diamines, the solution of aliphatic diamine-carbonyl compound condensation product obtained after distillation of water from the aliphatic diamine-carbonyl compound reaction mixture is hydrogenated directly, generally at superatmospheric pressure (preferably about 20 to 1000 atmospheres) at a temperature of about 0° to 250° in the presence of a hydrogenation catalyst. This procedure has advantages over hydrogenation of mixtures of carbonyl-compound and diamine, for such mixtures give rise to the formation of large amounts of water during the hydrogenation. Suitable hydrogenation catalysts for the hydrogenation of the solutions of aliphatic diamine-carbonyl compound condensation products in accordance with this invention include those elements of the 1st, 2nd, 6th, 7th, and 8th groups of the periodic system which have a hydrogenation action, and compounds or alloys of those elements, in particular copper, palladium, platinum, iron, cobalt and nickel, either alone or in conjunction with each other. Particularly effective as catalysts for this purpose are nickel alloy catalysts, finely divided nickel supported on kieselguhr, finely divided cobalt and the like. In certain instances small amounts of alkali (about 0.1 to 2.0%) in these catalysts according to the invention have a beneficial effect on the hydrogenation reaction. In general hydrogenation catalyst supports and/or promoters, such as aluminum, thorium, silicon, and chromium oxides, pumice, silica gel, and kieselguhr may be used in conjunction with these catalysts.

The invention is further illustrated by means of the following examples:

*Example 1.*—To 58.1 grams (0.50 mole) hexamethylenediamine, H$_2$N(CH$_2$)$_6$NH$_2$, dissolved in 650 milliliters of cyclohexane, was added 72.1 grams (1.00 mole) isobutyraldehyde, (CH$_3$)$_2$CHCHO dropwise with stirring during a period of 0.5 hour, maintaining the temperature at 55° to 45° C. The reaction mixture was processed an additional 0.5 hour under these conditions, after which the water formed was separated from the organic layer. The product was then distilled, and further amounts of water were collected as cyclohexane-water binary. The remaining cyclohexane solvent was thereafter removed by distillation, following which there was obtained: 2.3 grams foreshots, B. P. 121° to 126° C./7 to 6 mm. (2.1% conversion); 94.5 grams N,N'-diisobutylidenehexamethylenediamine, (CH$_3$)$_2$CHCH=N(CH$_2$)$_6$N=CHCH(CH$_3$)$_2$ B. P. 128° to 133° C./7 to 8 mm. (84.4% conversion); 9.9 grams higher boiling, medium brown oily liquid, not distilled (8.8% conversion). The neutral equivalent of the N,N'-diisobutylidenehexamethylenediamine cut was 112.6 (theory= 112.11). The refractive index of N,N'-diisobutyl- idenehexamethylenediamine from three different preparations was 1.4465, 1.4467, 1.4469 at 25° C. (D line).

*Example 2.*—To 116.2 grams (1.00 mole) hexamethylenediamine, H$_2$N(CH$_2$)$_6$NH$_2$, dissolved in 765.4 grams (1000 milliliters) cyclohexane was added 108.9 grams (1.51 moles) isobutyraldehyde, (CH$_3$)$_2$CHCHO, dropwise with stirring over 2.0 hours maintaining the temperature at about 38° C. The reaction was allowed to continue for 1.3 hours at this temperature, then overnight at room temperature. The resulting mixture was separated into 932.2 grams of clear, water-white upper layer and 50.2 grams of cloudy, faintly yellow, slightly viscous lower layer. An aliquot composited of upper and lower layers was freed of water by azeotropic distillation, then hydrogenated (see Example 6). Isolation of N-monoisobutylhexamethylenediamine and N,N'-diisobutylhexamethylenediamine indicated 1.7% conversion to recovered hexamethylenediamine, 43.0% conversion to N-monoisobutylidenehexamethylenediamine, H$_2$N(CH$_2$)$_6$N=CHCH(CH$_3$)$_2$, 42.3% conversion to N,N'-diisobutylidenehexamethylenediamine, (CH$_3$)$_2$CHCH=N(CH$_2$)$_6$N=CHCH(CH$_3$)$_2$, and 6.1% conversion to higher boiling materials (not distilled).

*Example 3.*—To 88.1 grams (1.00 mole) tetramethylenediamine, H$_2$N(CH$_2$)$_4$NH$_2$, dissolved in 379.6 grams (500 milliliters) cyclohexane was added 144.2 grams (2.00 moles) isobutyraldehyde, (CH$_3$)$_2$CHCHO, dropwise with stirring over 2.5 hours, maintaining the temperature at 40° to 45° C. After processing an additional 2.5 hours under these conditions and overnight at room temperature, 35.0 grams of water produced by the reaction was removed by azeotropic distillation. Distillation of 254.7 grams of the 602.0 grams of pale orange, slightly cloudy, residual reaction product gave: 149.2 grams recovered cyclohexane, B. P. 75° to 82° C.; 8.1 grams foreshots, B. P. 68° to 116° C./20 mm. (8.3% conversion); 84.8 grams N,N'-diisobutylidenetetramethylenediamine, (CH$_3$)$_2$CHCH=N(CH$_2$)$_4$N=CHCH(CH$_3$)$_2$ B. P. 116° to 119° C./20 to 19 mm. (conversion=86.4%); 11.0 grams higher boiling, dark brown oily liquid, not distilled (11.2% conversion). Analytical data obtained on the N,N'-diisobutylidenetetramethylenediamine cut were: neutral equivalent=99.1 and 99.0 (theory=98.10), % N=14.1% (theory=14.28%), refractive index= 1.4473 at 25° C. (D line).

*Example 4.*—To 61.4 grams (1.00 mole) ethylenediamine, 98% H$_2$NCH$_2$CH$_2$NH$_2$, dissolved in 379.6 grams cyclohexane was added 144.2 grams (2.00 moles) isobutyraldehyde, (CH$_3$)$_2$CHCHO, dropwise with stirring over 3.3 hours, maintaining the temperature at 42° to 48° C. After standing overnight the product was filtered by suction. The nearly water-white filtrate, which formed two layers, was distilled. In addition to recovered cyclohexane solvent, there was obtained: about 34.0 grams foreshots (evidently crude N-monoisobutylideneethylenediamine), B. P. 52°/5 mm. to 45°/2 mm. (about 29.8% conversion); about 82.5 grams N,N'-diisobutylideneethylenediamine, B. P. 45° to 48° C./2 mm. (about 49.1% conversion); about 22.0 grams high boilers, 47° to 158°/2 mm. including 9.1 grams undistilled brown, viscous oil (about 13.1% conversion). The neutral equivalent of the N,N'-diisobutylideneethylenediamine cut was 86.3 (theory=84.08).

*Example 5.*—40.0 grams (0.178 mole) N,N'-diisobutylidenehexamethylenediamine, 200 milliliters cyclohexane and 1.0 gram platinum oxide (PtO₂) was shaken in a silver-lined tube for 2 hours at 7° to 33° C. under 525 to 725 atmospheres hydrogen pressure. A pressure drop of 105 atmospheres occurred. The 178.9 grams of product was filtered and the tube and filter residue were washed with methanol. Distillation of the water-white filtrate gave: 313.8 grams recovered methanol and cyclohexane; 3.3 grams foreshots, B. P. 91° to 98° C./3 to 1.5 mm. (8.1% conversion); 35.1 gram N,N'-diisobutylhexamethylenediamine, (CH₃)₂CHCH₂NH(CH₂)₆NHCH₂CH(CH₃)₂, B. P. 101°/2 mm. to 111°/2.5 mm. (86.1% conversion); 0.9 gram distillation residue, clear oil (2.2% conversion). Titration of the methanol-cyclohexane cuts indicated 0.1% conversion to volatile bases. The neutral equivalent of the N,N'-diisobutylhexamethylenediamine cut was 114.4 and 113.9 (theory=114.11).

Example 6.—49.5 grams of an undistilled mixture of N-monoisobutylidenehexamethylenediamine and N,N'-diisobutylidenehexamethylenediamine in 169.9 grams cyclohexane (which had been prepared from isobutyraldehyde and hexamethylenediamine in 1.5/:1 mole ratio with azeotropic distillation to remove water) and 1.0 gram platinum oxide catalyst were shaken in a silver-lined tube for 2 hours at −3° to 30° C. under 545 to 785 atmospheres hydrogen pressure. A pressure drop of 155 atmospheres was observed. The 198.2 grams of product was filtered and the tube and filter residue were washed with methanol. Distillation of the clear, pale yellow filtrate gave: 282.0 grams recovered methanol and cyclohexane; 0.5 gram recovered hexamethylenediamine, B. P. up to 80° C./1.5 mm. (1.7% conversion); 18.5 grams N-monoisobutylhexamethylenediamine, H₂N(CH₂)₆NHCH₂CH(CH₃)₂, B. P. 83° to 91° C./2 mm. (43.0% conversion); 24.1 grams N,N'-diisobutylhexamethylenediamine.

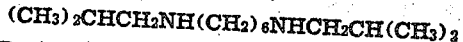
(CH₃)₂CHCH₂NH(CH₂)₆NHCH₂CH(CH₃)₂

B. P. 102° to 117°/2 mm. (42.3% conversion); 3.6 grams undistilled brown oily liquid (6.1% conversion). Titration of the methanol-cyclohexane cuts indicated less than 0.2% conversion to volatile bases. Analyses of the N-monoisobutylhexamethylenediamine cut were: neutral equivalent=86.5 (theory=86.10); and refractive index=1.4468 at 25° C. (D line); and of the N,N'-diisobutylhexamethylenediamine cut were: neutral equivalent, 112.4 (theory=114.11); refractive index=1.4437 at 25° C. (D line).

Example 7.—39.3 grams (0.20 mole) N,N'-diisobutylidenetetramethylenediamine and 1.0 gram platinum oxide catalyst in 200 milliliters of cyclohexane were shaken in a silver-lined tube for 2 hours at 33° to 46° C. under 600 to 710 atmospheres hydrogen pressure. A pressure drop of 150 atmospheres was observed. The 176.2 grams of product thus obtained was filtered and the tube and the filter residue were washed with methanol. Distillation of the clear, water-white filtrate gave: 244.5 grams recovered methanol and cyclohexane; 2.9 grams foreshots, B. P. 111° to 119°/9 mm. (7.3% conversion); 34.3 grams N,N'-diisobutyltetramethylenediamine, (CH₃)₂CHCH₂NH(CH₂)₄NHCH₂CH(CH₃)₂

B. P. 119° to 120° C./10 to 7 mm. (85.8% conversion); 1.5 grams undistilled, light brown oil (3.8% conversion). Titration of the methanol-cyclohexane cuts indicated less than 0.3% conversion to volatile bases. The neutral equivalent of the N,N'-diisobutyltetramethylenediamine cut was 101.2 (theory=100.12). A redistilled sample analyzed as follows: neutral equivalent=99.7 and 99.8; refractive index=1.4388 at 25° C. (D line); specific gravity=0.804 gram/milliliter; boiling point=127° to 128° C./15 mm.

Example 8.—Two charges each comprising 29.8 grams (0.177 mole) N,N'-diisobutylideneethylenediamine, 200 milliliters cyclohexane and 1.0 gram platinum oxide catalyst were shaken in silver-lined tubes for 2 hours at 26° to 127° C. under 630 to 750 atmospheres hydrogen pressure. Pressure drops of 135 to 115 atmospheres were observed. The products (157.2 grams and 165.6 grams) were filtered and the tubes and filter residues were washed with methanol. Distillation of the composite water-white filtrate gave: 516.1 grams recovered methanol and cyclohexane; 1.7 grams foreshots, B. P. 62° to 63° C./18 mm. (2.8% conversion); 53.9 grams product, B. P. 64° to 117°/18 mm. and 61° to 42°/1 to 0.5 mm. (88.5% conversion); 0.7 gram undistilled brown oil (1.2% conversion). Redistillation of the principal cut separated the product into (a) N,N'-diisobutylethylenediamine, (CH₃)₂CHCH₂NHCH₂CH₂NHCH₂CH(CH₃)₂

B. P. 95° to 101° C./22 mm., neutral equivalent=86.3 (theory=86.10), refractive index=1.4457 at 25° C. (D line) and (b) 1,3-diisobutyl-2-isopropylimidazolidine,

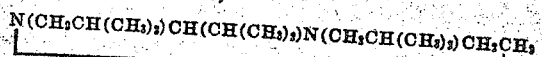
N(CH₂CH(CH₃)₂)CH(CH(CH₃)₂)N(CH₂CH(CH₃)₂)CH₂CH₂

B. P. 130° to 131° C./22 mm., neutral equivalent=114.6 (theory=113.12).

Example 9.—A mixture containing 500 milliliters of cyclohexane and 92.6 grams of hexamethylenediamine was heated with stirring at 50° C. in an apparatus equipped with a reflux condenser and 186.8 grams of benzaldehyde was added thereto over a period of 0.8 hour. The stirring was continued for one hour longer at 40° to 50° C. which caused the formation of a milky solution. This solution was filtered and the filtrate was transferred to a still equipped with a fractionating column and a decanting head. The mixture was refluxed for about 3 to 4 hours during which time 21 milliliters of water was collected as a lower layer in the decanting head. The distillation was continued until a residue consisting of 580.8 grams of clear, light-brown liquid was obtained.

One-quarter of this mixture was admixed with one gram of platinum oxide catalyst and was hydrogenated for 2 hours at 35° to 36° under a pressure of 630 to 715 atmospheres. The resulting product was filtered and distilled yielding a fraction (54.3 grams) having a boiling point of 178° to 196° at a pressure of about 1 millimeter. For the most part this fraction boiled at 178° C. at a pressure of about 1 millimeter. This product was fairly pure N,N'-dibenzylhexamethylenediamine (neutral equivalent, 149.4, 150.1; theory, 148.12; refractive index, 1.5413 at 25° C.), (D line).

The foreshots from three hydrogenation runs conducted as above were redistilled yielding a fraction (43.3 grams) having a boiling point of 199° to 200° C. at a pressure of 25 millimeters. This material was N-monobenzylhexamethylenediamine (neutral equivalent 103.8; theory 103.1; refractive index, 1.5152 at 25° (D line).

Example 10.—To a mixture containing 116.2 grams (1.0 mole) hexamethylenediamine and 448.4 grams of cyclohexane at a temperature of 45° to 55° C. was added 72.1 grams (1 mole) of isobutyraldehyde with stirring over a period of 1.4 hours. The stirring was continued for 0.5 hour after which the mixture was filtered and the filtrate was distilled. A cyclohexane-water fraction was recovered following which the remainder of the distillation was conducted at diminished pressure. This yielded a fraction (17 c. c.) having a boiling point of 68° to 73° at 5 to 6 millimeters. This material crystallized upon cooling and was identified as hexamethylenediamine. The next fraction (51 c. c.) boiled largely at about 82° at a pressure of 7 millimeters. This fraction consisted principally of N-monoisobutylidenehexamethylenediamine. The largest fraction (83 c. c.) was N,N'-diisobutylidenehexamethylenediamine which had a boiling point of 118° C. at about 6 millimeters.

The N-alkylidene and N-aralkylidene diamines prepared in accordance with this invention are of particular value in the manufacture of diamines which are useful in the manufacture of polyamide resins. For example, the N-monoisobutylhexamethylenediamine and the N,N'-diisobutylhexamethylenediamine, the N-monobenzylhexamethylenediamine and the N,N'-dibenzylhexamethylenediamine are especially valuable as intermediates in the formulation of elastic polyamides. In general the quality of polyamide resins depends in part upon the purity of the intermediates, and the products obtained in accordance with this invention are of a sufficiently high degree of purity that polyamides of high quality can be prepared therefrom.

It is to be understood that the invention is not limited to the specific embodiments described in the examples, but that other methods of applying the principle of the invention may be employed without departing from the spirit and scope thereof. Accordingly, I do not limit myself except as set forth in the following claims.

The N-alkylidene diamines, N-cycloalkylidene diamines, and N-aralkylidene diamines which are prepared by the method described in the above specification include both the mono- and di-substituted products, i. e. the term N-alkylidene diamine as used herein means N-monoalkylidene diamines and/or N,N'-dialkylidene diamines, and the term N-aralkylidene diamine as used herein means N-monoaralkylidene diamines and/or N,N'-diaralkylidene diamines.

I claim:

1. A process for the preparation of compounds of the class consisting of N-alkylidene, N-aralkylidene, and N-cycloalkylidene aliphatic diamines which comprises adding a carbonyl compound of the class consisting of aliphatic aldehydes, aliphatic ketones, aromatic aldehydes, aromatic ketones, mixed aliphatic-aromatic ketones and cycloaliphatic ketones to a solution of aliphatic diamine in a solvent which is also a water-withdrawing azeotropic agent, maintaining the temperature during the addition of the carbonyl compound and during the initial stages of the resulting reaction at about 20° to 55° C. by cooling the reaction mixture, continuing the reaction at a temperature below 120° C., distilling an azeotropic mixture of water and the said water-withdrawing azeotropic agent from the resulting reaction mixture until the formation of water by the reaction between the carbonyl compound and the diamine virtually ceases, whereby a product containing a compound of the class consisting of N-alkylidene, N-aralkylidene, and N-cycloalkylidene aliphatic diamines is produced in the absence of a substantial quantity of polymeric product, and thereafter separating the said compound from the said reaction product.

2. The process for the preparation of compounds of the class consisting of N-alkylidene, N-aralkylidene, and N-cycloalkylidene aliphatic diamines which comprises adding slowly, with stirring, a carbonyl compound of the class consisting of aliphatic aldehydes, aliphatic ketones, aromatic aldehydes, aromatic ketones, mixed aliphatic-aromatic ketones and cycloaliphatic ketones to an aliphatic diamine at a temperature within the range of about 20° to 55° C. in the presence of a water-withdrawing azeotropic agent and thereafter distilling an azeotropic binary of water and the said azeotropic agent from the resulting reaction mixture, whereby a product consulting a compound of the class consisting of N-alkylidene, N-aralkylidene and N-cycloalkylidene aliphatic diamines is produced and thereafter separating the said compound from the said reaction product.

3. A process for the preparation of N-isobutylidene diamines which comprises adding isobutyraldehyde to an aliphatic diamine at a temperature within the range of about 20° to 55° C. in the presence of a water-withdrawing azeotropic agent and thereafter distilling a binary of water and the said azeotropic agent from the resulting reaction mixture, whereby a mixture containing as the chief reaction products substantial amounts of both N-monoisobutylidene aliphatic diamine and N,N'-diisobutylidene aliphatic diamines is produced, and thereafter separating said diamines from the said reaction product.

4. A process for the preparation of N-isobutylidenediamines which comprises adding isobutyraldehyde slowly, with stirring, to a solution of hexamethylenediamine in a solvent which is also a water-withdrawing azeotropic agent, while cooling the mixture to maintain the temperature within the range of about 20° to 55° C., and thereafter distilling a binary of water and the said azeotropic agent from the resulting reaction mixture, whereby a distillation residue containing N-isobutylidenehexamethylenediamines as the chief reaction products is obtained.

5. The process set forth in claim 4 in which the said water-withdrawing azeotropic agent is cyclohexane.

6. A process for the preparation of N-isobutylidenediamines which comprises adding isobutyraldehyde slowly, with stirring, to tetramethylenediamine at a temperature within the range of about 20° to 55° C. in the presence of a water-withdrawing azeotropic agent and thereafter distilling a binary of water and the said azeotropic agent from the resulting mixture whereby a product containing a substantial amount of both N-monoisobutylidenetetramethylenediamine and N,N'-diisobutylidenetetramethylenediamine is produced without the formation of any substantial amount of polymeric material, and thereafter separating the said N-monoisobutylidenetetramethylenediamine and N,N'-diisobutylidenetetramethylenediamine from the resulting product.

7. A process for the preparation of N-benzylidenediamines which comprises adding benzaldehyde to a solution of an aliphatic diamine in a water-withdrawing azeotropic agent at a temperature in the range of about 20° to 55° C. and thereafter distilling an azeotropic binary of water and the said azeotropic agent from the resulting reaction mixture, whereby a product containing a substantial amount of both N-monobenzylidene aliphatic diamine and N,N'-dibenzylidene aliphatic diamine is produced and thereafter separating the said N-monobenzylidene aliphatic diamine and N,N'-dibenzylidene aliphatic diamine from the said reaction product.

8. A process for the preparation of N-benzylidenediamines which comprises adding benzaldehyde to a solution of hexamethylenediamine in a solvent which is also a water-withdrawing azeotropic agent, maintaining the temperature of the resulting mixture during the initial stages of the ensuing reaction at about 20° to 50° C. by cooling the reaction mixture, and thereafter distilling an azeotropic binary of water and the said azeotropic agent from the resulting reaction mixture whereby a product containing a substantial amount of both N-monobenzylidenehexamethylenediamine and N,N'-dibenzylidenehexamethylenediamine is produced and thereafter separating the said N-monobenzylidenehexamethylenediamine and N,N'-dibenzylidenehexamethylenediamine from the resulting reaction product.

9. A process for the preparation of N-benzylidenediamines which comprises adding benzaldehyde to a solution of hexamethylenediamine in cyclohexane with stirring, and maintaining the temperature of the resulting mixture at about 40° to 50° C. during the ensuing reaction, thereafter distilling an azeotropic binary of water and cyclohexane from the resulting mixture whereby a residue containing N-monobenzylidenehexamethylenediamines is obtained, said residue being characterized in that it gives upon hydrogenation a mixture of N-monobenzylhexamethylenediamine and N,N'-dibenzylhexamethylenediamine.

RICHARD E. BROOKS.

REFERENCES CITED

The following references are of record in the file of this patent:

UNITED STATES PATENTS

| Number | Name | Date |
|---|---|---|
| 558,863 | Valentiner | Apr. 21, 1896 |
| 1,640,899 | Kropp | Aug. 30, 1927 |
| 2,045,574 | Adkins | June 30, 1936 |
| 2,217,622 | Lichty | Oct. 8, 1940 |
| 2,264,894 | Shoemaker | Dec. 2, 1941 |
| 2,270,215 | Fitch | Jan. 13, 1942 |
| 2,307,455 | Ehrlich | Jan. 5, 1943 |
| 2,317,757 | Graf | Apr. 27, 1943 |
| 2,220,065 | Clarkson | Nov. 5, 1940 |